(12) United States Patent
Palmer et al.

(10) Patent No.: US 11,506,259 B2
(45) Date of Patent: Nov. 22, 2022

(54) CANTILEVERED WORM GEAR ASSEMBLY WITH LIMITER BUSHING

(71) Applicant: Steering Solutions IP Holding Corporation, Saginaw, MI (US)

(72) Inventors: Caleb S. Palmer, Freeland, MI (US); Travis L. Palmer, Frankenmuth, MI (US); Joel A. Bickel, Millington, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 454 days.

(21) Appl. No.: 16/600,102

(22) Filed: Oct. 11, 2019

(65) Prior Publication Data

US 2021/0108705 A1 Apr. 15, 2021

(51) Int. Cl.
| | | |
|---|---|---|
| *F16H 1/16* | (2006.01) | |
| *F16H 57/021* | (2012.01) | |
| *B62D 5/04* | (2006.01) | |
| *F16H 55/22* | (2006.01) | |

(52) U.S. Cl.
CPC .......... *F16H 1/166* (2013.01); *B62D 5/0409* (2013.01); *F16H 55/22* (2013.01); *F16H 57/021* (2013.01); *F16H 2057/0213* (2013.01)

(58) Field of Classification Search
CPC ........ F16H 1/166; F16H 55/22; F16H 57/021; F16H 57/2057; F16H 57/0213; B62D 5/0406
USPC ....................................................... 180/444
See application file for complete search history.

(56) References Cited

U.S. PATENT DOCUMENTS

| | | | | |
|---|---|---|---|---|
| 6,357,313 B1* | 3/2002 | Appleyard | ............ | F16H 57/021 74/388 PS |
| 6,491,131 B1* | 12/2002 | Appleyard | ................ | F16D 3/68 180/444 |
| 6,550,568 B2* | 4/2003 | Ross | .................... | B62D 5/0409 180/444 |
| 8,334,412 B2* | 12/2012 | Azemi | ................... | C07C 319/18 568/41 |
| 8,336,412 B1 | 12/2012 | Ishii et al. | | |
| 2003/0146039 A1* | 8/2003 | Sano | .................... | B62D 5/0409 180/444 |
| 2005/0161277 A1 | 7/2005 | Bock et al. | | |
| 2010/0181139 A1* | 7/2010 | Tokura | .................... | F16C 27/08 180/444 |
| 2014/0174843 A1* | 6/2014 | Kimoto | ................ | B62D 5/0424 180/444 |

(Continued)

*Primary Examiner* — Tony H Winner
(74) *Attorney, Agent, or Firm* — Dickinson Wright PLLC

(57) ABSTRACT

A power steering assembly includes an electric motor having an output shaft extending therefrom. The assembly also includes a housing containing a worm gear operatively coupled to a steering shaft, the worm gear rotatable about a worm gear axis. The assembly further includes an electric motor and a worm arranged to engage the worm gear, the worm extending from the output shaft of the electric motor as a single, integrally formed shaft, the single, integrally formed shaft extending axially from a first end to a second end and being cantilevered to allow the second end to deflect. The assembly yet further includes a bushing surrounding a portion of the shaft proximate the second end of the shaft, the bushing and the portion of the shaft defining a clearance therebetween.

13 Claims, 2 Drawing Sheets

(56) References Cited

U.S. PATENT DOCUMENTS

2015/0360719 A1* 12/2015 Kang .................... F01D 25/164
                                                                           384/222
2017/0328113 A1* 11/2017 Li ......................... E05F 15/431
2021/0107556 A1* 4/2021 Palmer ................. B62D 5/0409

* cited by examiner

CANTILEVERED WORM GEAR ASSEMBLY WITH LIMITER BUSHING

BACKGROUND OF THE INVENTION

Vehicles may employ a power steering mechanism that provides torque assist to a steering shaft of the vehicle and/or road feedback to a hand wheel through a worm/worm gear reduction assembly. Cantilevered worm arrangements may be over-constrained or—on the opposite end of the spectrum—allowed to bend to the point of breaking.

SUMMARY OF THE DISCLOSURE

According to one aspect of the disclosure, a power steering assembly includes an electric motor having an output shaft extending therefrom. The assembly also includes a housing containing a worm gear operatively coupled to a steering shaft, the worm gear rotatable about a worm gear axis. The assembly further includes an electric motor and a worm arranged to engage the worm gear, the worm extending from the output shaft of the electric motor as a single, integrally formed shaft, the single, integrally formed shaft extending axially from a first end to a second end and being cantilevered to allow the second end to deflect. The assembly yet further includes a bushing surrounding a portion of the shaft proximate the second end of the shaft, the bushing and the portion of the shaft defining a clearance therebetween.

According to another aspect of the disclosure, a power steering assembly includes an electric motor having an output shaft extending therefrom. The assembly also includes a housing containing a worm gear operatively coupled to a steering shaft, the worm gear rotatable about a worm gear axis. The assembly further includes an electric motor and a worm arranged to engage the worm gear, the worm extending from the output shaft of the electric motor as a single, integrally formed shaft, the single, integrally formed shaft extending axially from a first end to a second end and being cantilevered to allow the second end to deflect. The assembly yet further includes a portion of the housing surrounding a portion of the shaft proximate the second end of the shaft, the portion of the housing and the portion of the shaft defining a clearance therebetween.

According to yet another aspect of the disclosure, a method of assembling a power steering assembly is provided. The method includes linearly adjusting at least one component of the power steering assembly to set a backdrive caused by contact between threads of a worm and teeth of a worm gear. The method also includes supporting the worm in a cantilevered manner to allow an end of the worm to deflect. The method further includes limiting deflection of the end of the worm.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the invention will be described with reference to specific embodiments without limiting same. It is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale, as some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
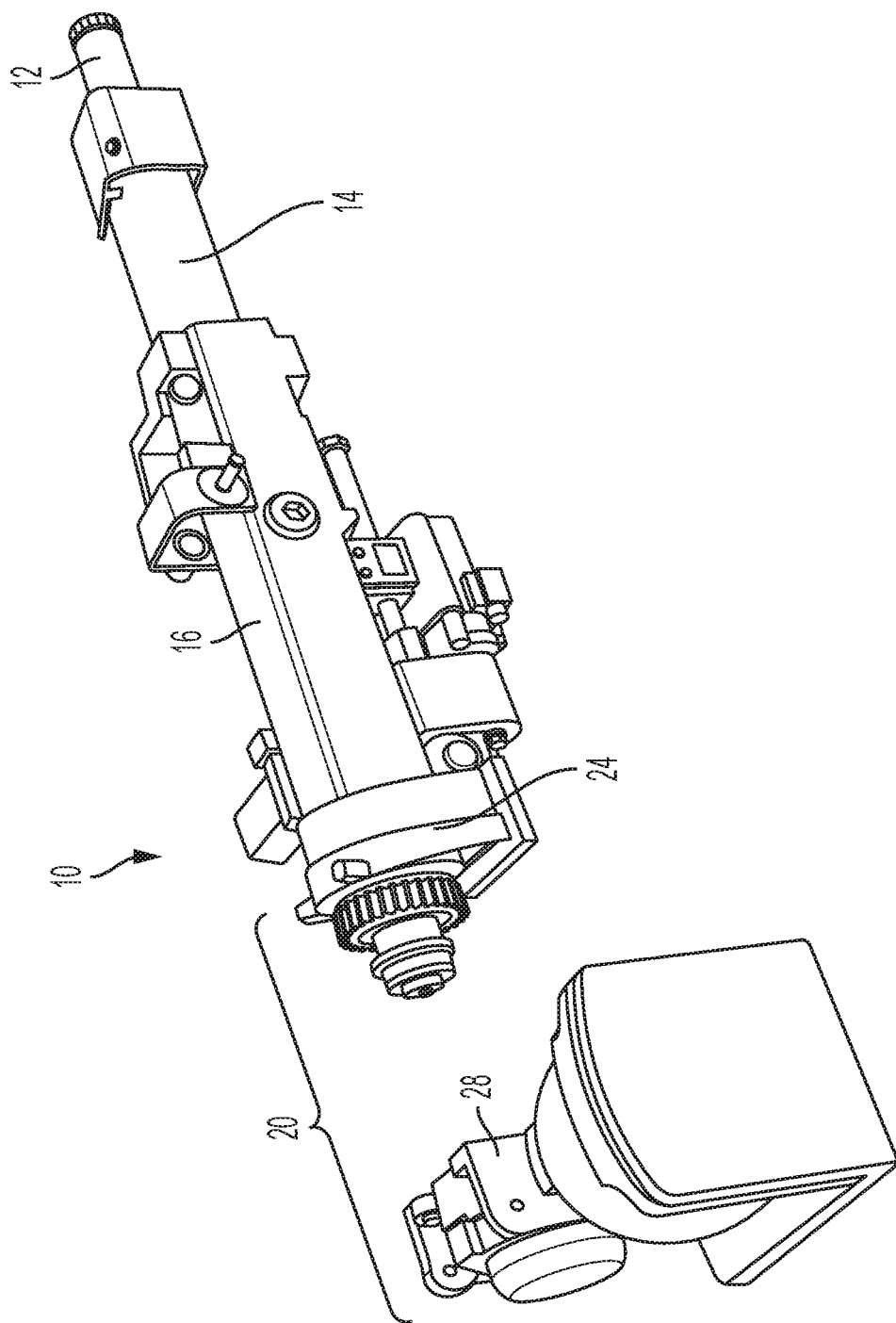
FIG. 1 is a perspective view of a portion of a power steering assembly.

Referring to FIG. 1, a portion of a steering column assembly is illustrated and generally referenced with numeral 10. The steering column assembly 10 includes a steering shaft 12 that is operatively coupled to a steering input device, such as a steering wheel, at one end and to one or more intermediate components that transfer rotation of the steering shaft to road wheels of a vehicle. The road wheel connection of the steering shaft 12 may be made electrically, such as in steer-by-wire applications. The steering shaft 12 is at least partially surrounded by an upper jacket 14 that extends within a lower jacket 16.

Figure 2:
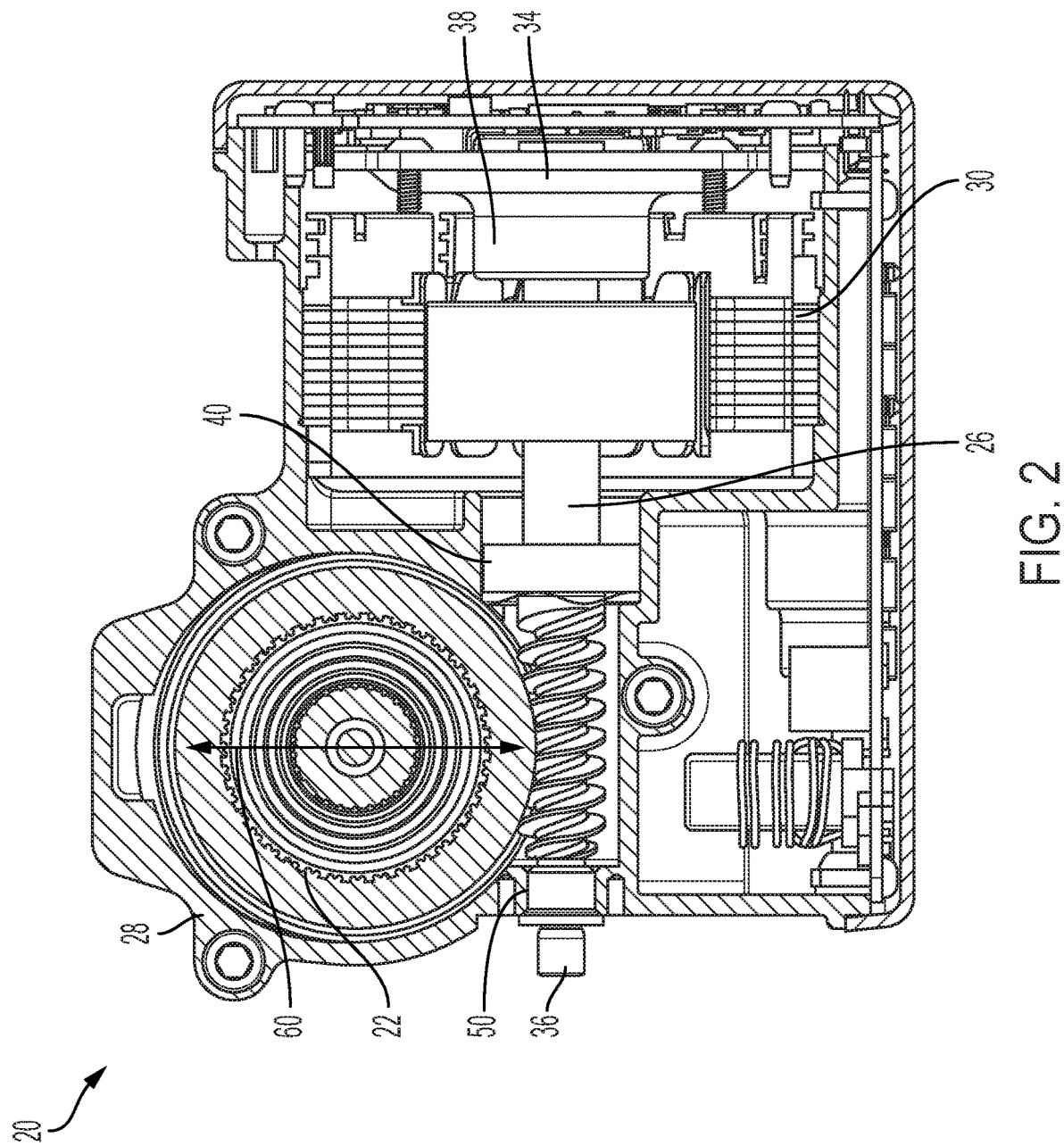
FIG. 2 is an elevational view of a worm gear assembly of the power steering assembly.

Referring now to FIG. 2, with continued reference to FIG. 1, a power steering assembly 20 is provided to assist an operator of the vehicle with steering maneuvers carried out with the steering column assembly 10. The power steering assembly 20 includes a worm gear 22 at least partially disposed within a first housing 24 (FIG. 1). In the illustrated embodiment, a portion of the lower jacket 16 is the first housing 24, as they are an integrally formed part. The power steering assembly 20 also includes a worm 26 that is at least partially disposed within a second housing 28 that also houses an electric actuator, such as an electric motor 30. Although the worm 26 and the worm gear 22 are described above and illustrated in the Figures as being located in different housings, it is to be appreciated that a single housing is employed to at least partially contain both the worm 26 and the worm gear 22 in some embodiments.

The electric motor 30 includes a motor shaft that rotates during operation of the electric motor 30. The motor shaft is integrated with the worm 26 to be a single, unitary component (i.e., shaft) extending as a rotatable output member of the electric motor 30. Therefore, the worm 26 and the motor shaft may also be referred to herein as a shaft and designated with numeral 26. Threads of the worm 26 are arranged to engage the worm gear 22 such that rotation of the worm 26 causes rotation of the worm gear 22. The worm gear 22 is operatively coupled to the steering shaft 12 to provide a torque to the steering shaft 12 to either assist the driver during turning maneuvers (i.e., EPS) or for resistance that gives road feedback to a driver (i.e., steer-by-wire).

The shaft 26 extends axially from a first end 34 to a second end 36. The motor shaft portion of the shaft 26 is located closer to the first end 34 than the second end 36. The worm portion of the shaft 26 is located closer to the second end 36 of the shaft 26. A first bearing 38 is located proximate the motor shaft portion of the shaft 26 to support the shaft 26. In other words, the first bearing 38 is locater closer to the first end 34 of the shaft than the second end 36. A second bearing 40 is axially spaced from the first bearing 38 and is located further away from the first end 34 of the shaft, when compared to the distance between the first bearing 38 location and the first end 34. The second bearing 40 cantilevers the worm section (i.e., portion of shaft 26 with threads) of the shaft 26.

The second end 36 of the shaft 26 is permitted to deflect with loading of the power steering assembly 20 due to the cantilevered nature of the assembly. A limiter bushing 50 surrounds a portion of the shaft 26 proximate the second end 36. A clearance is present between the limiter bushing 50 and the shaft 26 to avoid over-constraining the assembly. However, the clearance is tuned to avoid contact between the limiter bushing 50 and the shaft 26 during normal operating conditions, but to allow contact during extreme operational conditions to ensure that the worm shaft 26 does not break upon significant deflection.

Although the controlled clearance for the shaft 26 is described above as being facilitated by the limiter bushing 50, it is to be understood that an alternative embodiment does not include a limiter bushing and simply relies upon the structure of the surrounding housing.

The embodiments described herein may be combined with a linear slide capability of the steering assist assembly 20. Linear sliding in the direction referenced with numeral 60 sets the friction of the steering assist assembly 20, as described in U.S. patent application Ser. No. 16/598,827, filed on Oct. 10, 2019, the disclosure of which is incorporated by reference herein in its entirety. However, it is to be appreciated that alternate methods of setting the friction are contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power steering assembly comprising:
   an electric motor having an output shaft extending therefrom;
   a housing containing a worm gear operatively coupled to a steering shaft, the worm gear rotatable about a worm gear axis;
   a worm arranged to engage the worm gear, the worm extending from the output shaft of the electric motor as a single, integrally formed shaft, the single, integrally formed shaft extending axially from a first end to a second end and being cantilevered to allow the second end to deflect; and
   a bushing surrounding a portion of the shaft proximate the second end of the shaft, the bushing and the portion of the shaft defining a clearance therebetween, wherein the bushing is the immediately adjacent component relative to the second end of the shaft.

2. The power steering assembly of claim 1, wherein the first end of the shaft is supported with a first bearing and an intermediate portion of the shaft is cantilevered with a second bearing.

3. The power steering assembly of claim 1, wherein the clearance between the bushing and the portion of the shaft allows the second end of the shaft to deflect a predefined amount before contact is made between the bushing and the portion of the shaft.

4. The power steering assembly of claim 1, wherein the housing is linearly moveable to set a friction level of contact between the worm and the worm gear.

5. The power steering assembly of claim 1, wherein the assembly is part of a steer-by-wire steering system.

6. A power steering assembly comprising:
   an electric motor having an output shaft extending therefrom;
   a housing containing a worm gear operatively coupled to a steering shaft, the worm gear rotatable about a worm gear axis;
   a worm arranged to engage the worm gear, the worm extending from the output shaft of the electric motor as a single, integrally formed shaft, the single, integrally formed shaft extending axially from a first end to a second end and being cantilevered to allow the second end to deflect; and
   a portion of the housing surrounding a portion of the shaft proximate the second end of the shaft, the portion of the housing and the portion of the shaft defining a clearance therebetween, wherein the portion of the housing is the immediately adjacent component relative to the second end of the shaft.

7. The power steering assembly of claim 6, wherein the first end of the shaft is supported with a first bearing and an intermediate portion of the shaft is cantilevered with a second bearing.

8. The power steering assembly of claim 6, wherein the clearance between the bushing and the portion of the shaft allows the second end of the shaft to deflect a predefined amount before contact is made between the bushing and the portion of the shaft.

9. The power steering assembly of claim 6, wherein the housing is linearly moveable to set a backdrive of the power steering assembly.

10. The power steering assembly of claim 6, wherein the assembly is part of a steer-by-wire steering system.

11. A method of assembling a power steering assembly comprising:
   linearly adjusting at least one component of the power steering assembly to set a backdrive caused by contact between threads of a worm and teeth of a worm gear;
   supporting the worm in a cantilevered manner to allow an end of the worm to deflect; and
   limiting deflection of the end of the worm with a component that is the immediately adjacent component relative to the second end of the shaft, wherein the component and the end of the worm define a clearance therebetween.

12. The method of claim 11, wherein limiting deflection of the end of the worm is done with a bushing surrounding a portion of the worm proximate the end of the worm.

13. The method of claim 11, wherein limiting deflection of the end of the worm is done with a portion of a housing surrounding a portion of the worm proximate the end of the worm.

* * * * *